United States Patent [19]

Spatig

[11] 4,103,817
[45] Aug. 1, 1978

[54] RAILWAY HOPPER CAR DOOR FRAME ASSEMBLY

[75] Inventor: Thomas G. Spatig, Huntington, W. Va.

[73] Assignees: The Chesapeake and Ohio Railway Company, Cleveland, Ohio; The Baltimore and Ohio Railroad Company, Baltimore, Md.

[21] Appl. No.: 592,862

[22] Filed: Jul. 3, 1975

[51] Int. Cl.² ............... B23K 31/02; B23K 37/04; B61D 7/18; B61D 7/72
[52] U.S. Cl. .................... 228/173 C; 105/280; 29/469; 228/178; 228/182; 228/212
[58] Field of Search ........... 105/280; 29/462, 469; 228/176, 178, 182, 164, 212, 173 C

[56] References Cited

U.S. PATENT DOCUMENTS

| 1,549,251 | 8/1925 | Geyer | 228/182 |
|---|---|---|---|
| 1,953,014 | 3/1934 | Hankins | 105/424 X |
| 2,341,612 | 2/1944 | Hankins | 105/280 |
| 2,519,529 | 8/1950 | Wine | 105/253 |
| 2,589,468 | 3/1952 | Wine | 105/280 X |
| 2,591,924 | 4/1952 | Dorey | 29/462 |
| 2,712,289 | 7/1955 | Dorey | 105/280 |
| 2,784,679 | 3/1957 | Wine | 228/178 |
| 3,516,147 | 6/1970 | Seedorff et al. | 228/212 X |

Primary Examiner—Drayton E. Hoffman
Assistant Examiner—Howard Beltran
Attorney, Agent, or Firm—Cushman, Darby & Cushman

[57] ABSTRACT

A door frame assembly process for conventional railway hopper car discharge openings. Five individual frame components are formed of plate or rolled angle members, and are assemblable in a jig. One dimension of the assembly is defined by the predetermined length of two of the main components, while the other dimension is adjustable in the jig. The door closure surface forming member is a separate component, and may be adjustably positioned with respect to the other four components before being affixed thereto.

4 Claims, 5 Drawing Figures

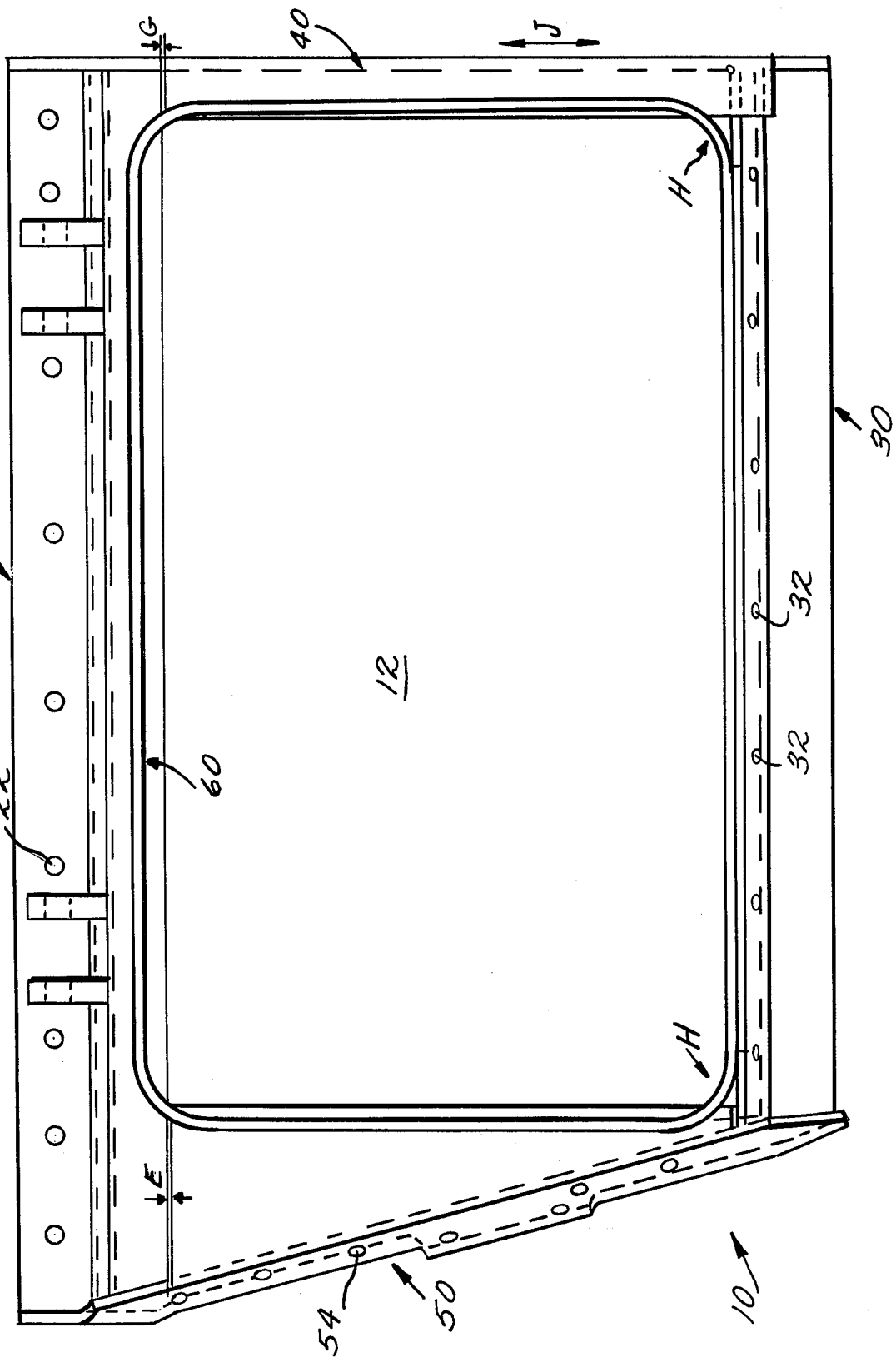

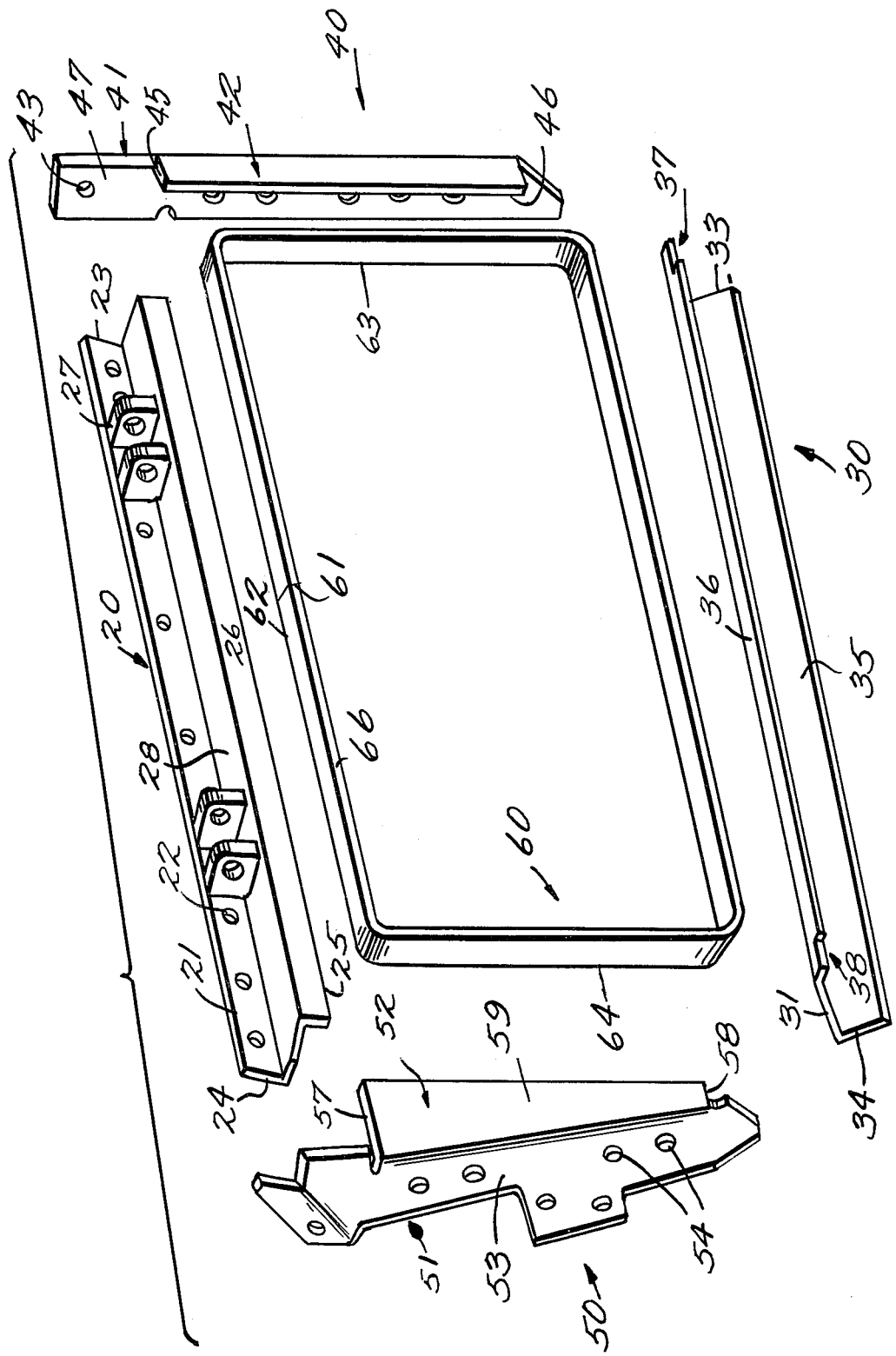

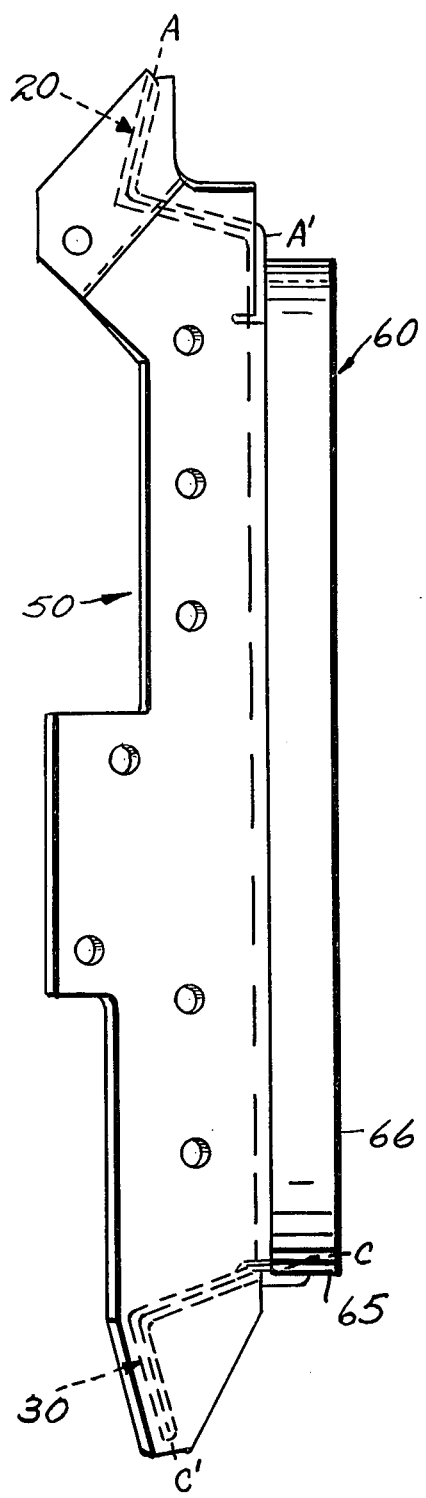
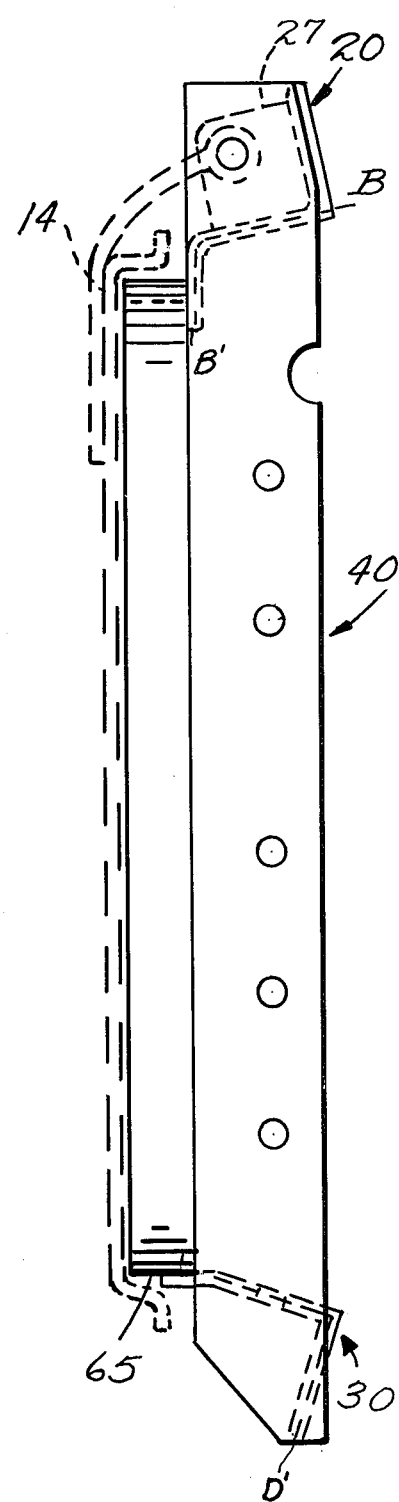

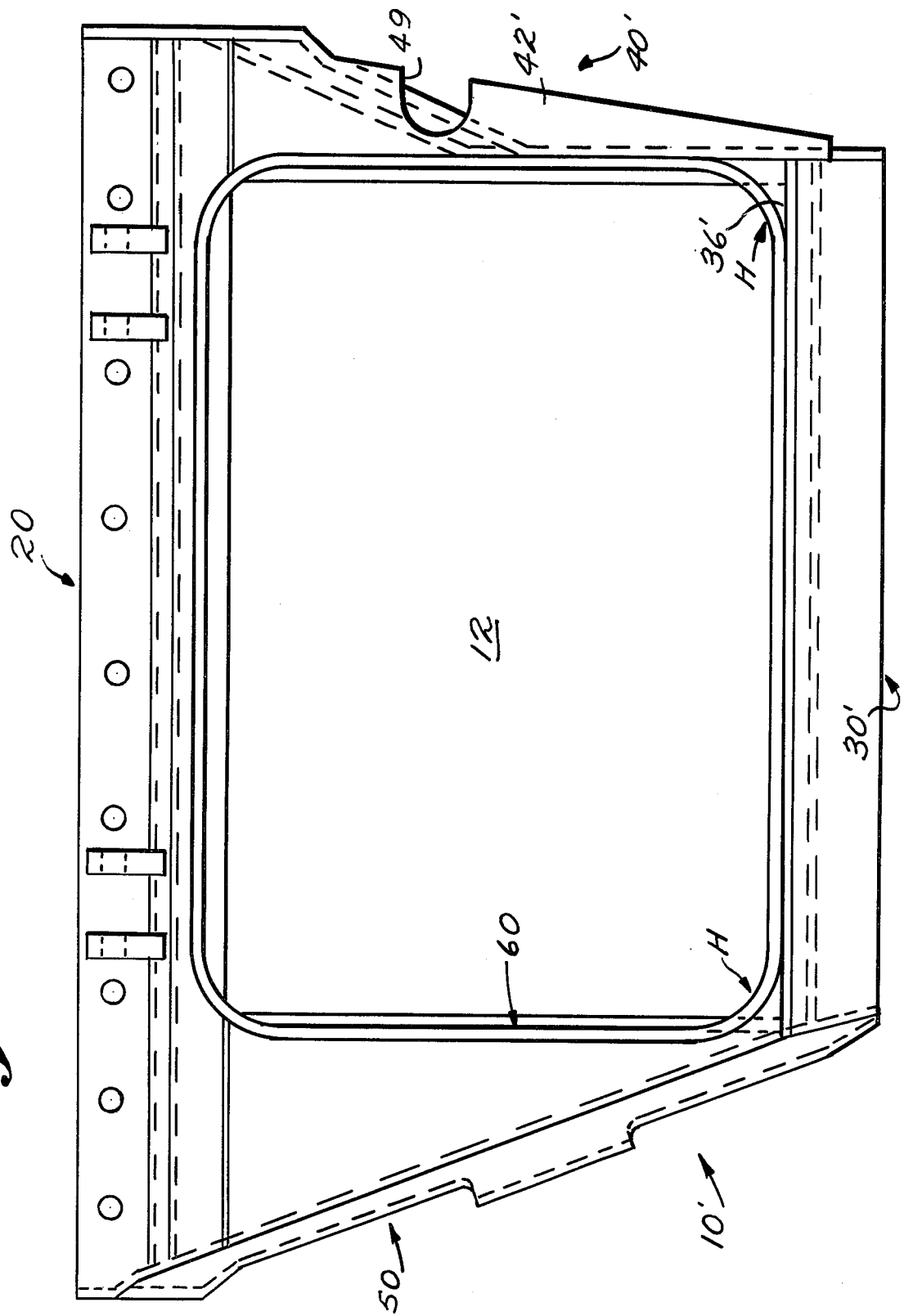

RAILWAY HOPPER CAR DOOR FRAME ASSEMBLY

BACKGROUND AND SUMMARY OF THE INVENTION

The invention relates to door frames for railway hopper cars. The standard door frames utilized in the construction of railway hopper cars are formed of cast steel, such as shown in U.S. Pat. No. 2,784,679, whether for cars with rectangular center sills or zee type center sills. Such cast frames are not always readily available, however, and require a great deal of specialized heavy equipment and shop space to produce. It is desirable, therefore, to be able to produce door frames of plate steel, or of plate steel and rolled angles, which may be merely joined for fabrication of door frames. Forming door frames in such a manner, however, can create a large number of problems - for instance, it is often difficult to effect proper assembly of the component parts, to effect secure attachment therebetween, to provide complete interchangeability between such frames and cast frames (which is necessary to allow utilization of standard doors, available hopper chutes and door locks), and to keep welding warpage to a minimum.

Prior art attempts to form hopper car door frames from component parts have not been entirely successful. U.S. Pat. No. 2,341,612 suggests assembly of component casts parts, however such an assembly while not requiring massive shop space still has the major problem of requiring the heavy equipment necessary in order to manufacture cast members, and additionally presents problems of having to assemble, cast, and properly align a door closure section with each of the frame component parts in addition to properly fitting the hopper chute, and to provide secure attachment between the component parts. U.S. Pat. No. 2,712,289 has suggested the use of hot pressed plate members for assembly to form a door frame. Such members are difficult to properly locate with respect to each other to form an exactly dimensioned door frame (as is necessary), however, require simultaneous assembly and securement of the door closure surface with the frame members, and do not provide for simple welding points that will still allow secure attachment of the members together to form a strong enough frame. U.S. Pat. No. 2,591,924 in another such prior art device confronted with similar problems. U.S. Pat. No. 2,519,529 alleviates one of the above-mentioned problems by providing a door closure surface that is integral, however such surface is also difficult to properly locate with respect to the frame members and must be secured by riveting, and no provision is suggested for ease of strong assembly of the frame members.

According to the present invention, a door frame assembly is provided that eliminates all the problems inherent in the prior art devices. The invention comprises four door frame members formed of plate steel, or plate steel and rolled angles. The two horizontal members are cut to a standard size, but do not inhibit the location of the vertical members, so that the vertical dimension can be determined precisely in an assembly jig to insure proper dimensioning of the door frame to fit all standard doors, hopper chutes and locks. Each of the four frame components abuts its adjoining components along two flat surfaces so that fillet welds can be effected therebetween, resulting in a strong and secure structure. The warping from welding is also thereby kept to a minimum. The door closure member is formed of bar steel, requiring only a single joint, and the frame members are adapted so that the door closure abuts flat surfaces on the side and top frame members, and is positively located by a lap surface of the bottom frame member. Thus it will be seen that according to the invention, a hopper railway car door frame is provided that has the following advantages:

(1) the components may be formed completely of plate steel or plate steel and rolled angles, (2) the components may be precisely dimensioned during assembly in an assembly jig, (3) the components may be assembled without the necessity of completely aligning a door closure surface associated therewith, the door closure surface being an integral member attached to the assembled frame and being readily locatable and properly secureable thereto, (4) the assembled frame is strong and secure, being welded along two areas at the joints thereof, and (5) the frame will replace conventional cast door frames, and receive the same doors and door latches. In general a hopper car door frame is provided that is quick and easy to assemble with great precision and sufficient strength.

The primary object of the present invention is to provide an economical hopper car door frame and one that is readily available. These and other objects of the invention will become clear from an inspection of the detailed description of the invention and the appended claims.

BRIEF DESCRIPTION OF THE DRAWINGS

FIG. 1 is a plan view of an exemplary assembled door frame according to the present invention;

FIG. 2 is a perspective exploded view of the components of the exemplary door frame shown in FIG. 1;

FIG. 3 is a side view of the exemplary assembled door frame of FIG. 1 looking from the left as viewed in FIG. 1; and FIG. 4 is a side view of the exemplary assembled door frame of FIG. 1 looking from the right as viewed in FIG. 1; and FIG. 5 is a plan view of a second exemplary embodiment of the door frame of the present invention.

DETAILED DESCRIPTION OF THE DRAWINGS

An exemplary door frame according to the present invention is shown generally at 10 in FIGS. 1–4. The frame 10 is composed of basically five major components, a top component, shown generally at 20, a bottom component, shown generally at 30, a pair of side components, shown generally at 40 and 50, and a door closure surface forming member — shown generally at 60. Each of the members 20, 30, 40, 50 and 60 are formed of plate steel or rolled steel angles, whereby the use of heavy equipment, such as is necessary to form cast frame components, can be avoided, and the frame components may be formed and assembled easily.

Each of the top 20 and bottom 30 frame components may be of a predetermined length so that the horizontal dimension of the assembly 10 is fixed thereby. The top frame component 20 has a surface 21 thereof with apertures 22 therein to allow attachment of the top portion of the assembly 10 to a railroad hopper car, around a discharge opening 12 in a wall thereof. Edges 23 and 24 of component 20 are for connection to surfaces of side components 40 and 50 respectively, while edge surface 25 of component 20 terminates the downward extent of component 20. Front surface 26 of component 20 provides for connection to door closure surface forming member 60. Hinge formations 27 are provided on component 20 for attachment to hinge pins of a standard hopper door (shown in phantom line at 14 in FIG. 4) that closes the opening 12 defined by the assembly 10. Middle portion 28 connects surfaces 21 and 26 of component 20, and may be perpendicular or slightly oblique thereto.

Bottom frame component 30 has a middle portion 31 thereof having apertures 32, FIG. 1 or the like therein for facilitating attachment of the bottom portion of an assembly 10 to a corresponding wall portion adjacent a discharge opening 12 formed in a railroad hopper car. Component 30 has edges 33 and 34 thereof for connection to corresponding surfaces on side components 40 and 50 respectively, said edges 33 and 34 being formed along the whole end width of the component 30, including middle portion 31, bottom portion 35, and top portion 36, less notches 37 and 38. Top portion 36 of component 30 provides a flat surface substantially perpendicular to surface 26 of component 20 for connection of component 30 to door closure surface forming member 60; and additionally has notches 37 and 38 formed therein for cooperation with a portion of side frame components 40 and 50.

The vertical portions 42 and 52 of side components 40 and 50 respectively, while constructed to be a predetermined length, need not be formed exactly to correspond to the dimensions of a discharge opening 12 which the assembly 10 will define, in order to allow easy assembly of the component parts of the assembly 10. When the assembly 10 is to be formed, the generally horizontally extending members — top and bottom components 20 and 30 respectively - of predetermined dimension are placed in a jig with the components 40 and 50, and the interengagements between components are adjusted by moving adjoining components relative to each other to correspond generally to the standard discharge opening 12 to be defined, and then securement of the components together is effected. Since the parts 20, 30, 40, 50 and 60 are formed of plate steel or rolled angle members, it is not necessary to form them with positive-locating surfaces thereon (as is done at 26, 34, 37 and 38 in U.S. Pat. No. 2,712,289), as is necessary with cast members (as in U.S. Pat. No. 2,341,612, for example), since there may be too much variation between pieces, and the members will have to be bent into shape when being assembled or uneven sides will ensue, possibly resulting in improper fit of a standard door therewith. The components 40 and 50 according to the present invention are formed with means that while providing for secure attachment to components 20 and 30 — do not attempt to positively locate them in relation to opening 12, whereby the above-mentioned adverse effects are avoided. Also, the door closure surface forming member 60 is separate from the other components, again assisting in the avoidance of the above-mentioned adverse effects. These same features provide an adaptability for different size openings 12 and for different hopper chute dimensions.

Side component 40 is basically a rolled angle member, having portions 41 and 42 thereof disposed substantially perpendicular with respect to each other. Portion 41 has a plurality of apertures 43 or the like formed therein for connection to a corresponding wall portion of a standard railway hopper car, while component 40 has a surface 42 thereof adapted for flush engagement with door closure surface forming member 60. Edge 45 of portion 42 is adapted to cooperate with but spaced from edge 25 of component 20, surface 46 (opposite to surface 42) of component 40 is adapted to cooperate with notch 37 in component 30, and surface 47 of portion 41 is adapted to cooperate with edges 23 and 33 of components 20 and 30 respectively. It will be seen that while the disposition of edges 45 and 25 generally determines the relative vertical position between components 20 and 40, the engagement between portion 42 (surface 46) and notch 37 is adjustable in dimension J so that the vertical dimension of the opening 12 is determined by relative movement between components 40 and 30, while in a jig, and then securement of the respective portions thereof to each other.

Side component 50 includes portions 51 and 52 thereof preferably disposed with respect to each other at an angle greater than 90°. Portion 51 has a surface 53 thereof in which a plurality of apertures 54 or the like are formed for connection of the side of an assembly 10 to corresponding wall portion of a railway hopper car. Surface 55 of portion 51 (opposite to surface 53 — see FIG. 1) cooperates with edge portions 24 and 34 or components 20 and 30 respectively to facilitate fillet welding therebetween. Edge 57 of portion 52 cooperates with but is spaced from edge 25 of component 20, while edge 58 of portion 52 cooperates with but is spaced from surface 36 of component 30. The length of vertical portion 52 is selected so that it is slightly less than the minimum distance feasible between the edge 25 and surface 36, whereby no vertical positioning function is performed in relation to opening 12 by the side component 50. Surface 59 provides a flat surface disposed in the same plane as surfaces 26 and 42 (and generally perpendicular to surface 36) for receipt of door closure surface forming member 60.

The door closure surface forming member 60 is a one-piece separate member preferably having only one joint 61 therein. The member 60 is adapted to be butted against and fillet welded at edges 62, 63 and 64 thereof to surfaces 26, 42 and 59 of components 20, 40 and 50 respectively, while flat surface 65, FIGS. 3 and 4 thereof is adapted to be lap welded to surface 36 of component 30. The surface 36 thus locates the member 60 in one direction with respect to the rest of the assembly 10, however since there are no positive locating means for member 60 associated with the components 20, 40 and 50, the other direction of the member 60 is adjusted after the components 20, 30, 40 and 50 have been assembled in order to insure proper fitting of a door 14 connected to portions 27 of member 20. The edge 66 of member 60 deines the engagement surface thereof with a door 14.

The individual parts of the assembly 10 in FIG. 4 now having been described, a method of assembly thereof according to the teachings of the present invention will now be set forth. A pair of opposed component frame members, for instance top and bottom components 20 and 30 respectively, are formed to a predetermined length by standard cold or hot-forming techniques (preferably cold-forming for simplicity), and the other opposed frame components 40 and 50 have portions 42 and 52 thereof formed to a generally predetermined length, although the exact dimensions thereof are not crucial, it being only important that the length portion 52 is slightly less than normal distance between components 20 and 30, and the length of portion 42 is longer than the normal distance between components 20 and 30.

After the components 20, 30, 40 and 50 are formed, they are assembled in a jig. The lengths of components 20 and 30 fix the horizontal dimension of the assembly 10 and the vertical dimension is determined by the dimensions of the jig. A suitably exemplary jig it being understood that the method of the invention is not restricted to the use of any particular jig, and that a wide variety of conventional types of jigs are suitable for practicing the invention. Some relative vertical movement is allowed between member 50 and components 20 and 30 by the intentionally relatively small gaps between portion 52 and surface 25 and notch 38 and by the slidable engagement between surface 46 and notch 37 of components 30 and 40. Once the individual components are disposed in their desired relationship in the jig, they are affixed together by fillet welding. The components 20 and 50 are fillet welded together along the two surfaces of lines A-A' (FIG. 3), components 20 and 40 are fillet welded together along the two surfaces of lines B-B' (FIG. 4), components 30 and 50 are fillet welded together along the two surfaces of lines C-C' (FIG. 3), and components 30 and 40 are fillet welded along their points of engagement along edge 33 and notch 37 and surfaces 46 and 47, or along lines D-D' (FIG. 4), or both of the above. The normally small gaps formed at E, F, and G by the non-abutting disposition of the vertical portions 52 and 42 of components 50 and 40 respectively and components 20 and 30 are all closed by welding or may be closed by an insert (not shown) of any suitable shape and construction disposed therein, and welded to the various components if desired.

After the components 20, 30 40 and 50 are assembled together, the member 60 is joined therewith. The surface 65 of member 60 locates member 60 vertically by engagement with surface 36 of component 30, while the horizontal location of the member 60 is adjusted to correspond to a door 14 that will be attached to portions 27 of component 20. The edges 62, 63 and 64 of member 60 are then fillet welded to the surfaces 26, 42 and 59 respectively, while the surface 65 is lap welded to the surface 36. Warpage from welding is kept to a minimum by utilization of the fillet, butt, and lap welds according to the present invention.

After completion of the assembly 10, it may be affixed to corresponding hopper chute wall portions of a standard railway hopper car with a conventional discharge opening by passing rivets or bolts through holes 22, 32, 43 and 54 into receiving structures in wall portions of a conventional railway hopper car adjacent a discharge opening 12 therein or assembly 10 may also be welded to the hopper chute wall portions. A conventional door 14 closes opening 12 by moving into engagement with edge 66 of member 60, and may suitable conventional door latch (not shown) may be used for latching the door 14 in its closed position.

The embodiment of the invention described above with reference to FIGS. 1 – 4 is specially adapted for use with cars having a rectangular center sill. For railway hopper cars having a zee type center sill, the embodiment illustrated in FIG. 5 should be used. The major difference between the assembly of FIG. 5 and that of FIGS. 1 – 4 is in the construction of the side component 40, 40'. In the FIGS. 1 – 4 embodiment, it is an angle member, while in the FIG. 5 embodiment it is a 2-piece weldment of plate steel, 40', the portion 42' thereof being wider than the corresponding portion 42 of component 40, and having a cutout portion 49 thereof for receipt of a zee center sill (such as shown at 10 in U.S. Pat. No. 2,591,924). Also, this embodiment is depicted in FIG. 5 also with a limited sliding engagement between portions 42' and 36' but with no notch 37 being formed in portion 36'. In such a situation, the portion 42' is constructed to be shorter than the minimum feasible spacing between members 30' and 20, and provides no limiting engagement therewith. The gaps H may be closed with an insert, same as with the frame of FIG. 1.

It will thus be seen that a method of constructing a railway hopper car door frame assembly having numerous advantages of the prior art devices has been herein shown and described. While the invention has been herein shown and described in what is presently conceived to be the most practical and preferred embodiments, it will be apparent to one of ordinary skill in the art that many modifications may be made thereof within the scope of the invention. For instance, instead of the horizontal components of the door frame assembly being of a predetermined length, the vertical components may be made a predetermined length, and the effective length of the horizontal components made adjustable. Other means besides rivets or the like passed through holes in the individual components of the assembly may be used to affix the assembly to a conventional railway hopper car. Other modifications are also possible, thus it is intended that the invention be accorded the full scope of the appended claims so as to encompass all equivalent methods and processes.

What is claimed is:

1. A method of constructng a railway hopper car door frame assembly having a vertical and a horizontal dimension comprising the steps of
   (a) forming opposed top and bottom components, two opposed side components and a door closure surface forming member, of plate steel, individual components of one pair of opposed components each being of a predetermined length,
   (b) placing said top, bottom, and side components in position to be assembled, one of said dimensions of said assembly to be formed being defined by said predetermined lengths of said one pair of opposed components,
   (c) adjusting said other dimension of said assembly to be formed by moving adjoining components relative to each other in said other dimension,
   (d) welding said components together along two surfaces of engagement therebetween each,
   (e) bringing said door closure surface forming member into engagement with receiving surfaces on said top, bottom, and side components,
   (f) adjusting said door closure surface forming member with respect to said top, bottom, and side components, and
   (g) welding said door closure surface forming member to the respective receiving surfaces of said top, bottom and side components.

2. A method as recited in claim 1 wherein said receiving surfaces of said top and side components of said assembly receive edge portions of said door closure surface forming member, and wherein said bottom component receives a surface portion of said member, and wherein said step of welding of said member to said top and side components is accomplished by butt welding and wherein said step of welding said member to said bottom component is accomplished by lap welding.

3. A method as recited in claim 1 wherein said receiving surface of said bottom component comprises a means for locating said member with respect to said components in one of said dimensions, and wherein said step of adjusting said member with respect to said components is accomplished by adjusting said member only in said other dimension.

4. A method as recited in claim 1 wherein said step of forming opposed top and bottom components, two opposed side components, and a door closure surface forming member of plate steel is accomplished by cold-forming said components and member of plate steel.

* * * * *